United States Patent
Teng et al.

(10) Patent No.: US 6,768,602 B2
(45) Date of Patent: Jul. 27, 2004

(54) DYE COMBINATIONS FOR MULTIPLE BANDPASS FILTERS FOR VIDEO DISPLAYS

(75) Inventors: Chia-Chi Teng, Piscataway, NJ (US); Suk Youn Suh, Warren, NJ (US); George Malinoski, Fair Haven, NJ (US)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/023,290

(22) Filed: Dec. 20, 2001

(65) Prior Publication Data

US 2002/0105258 A1 Aug. 8, 2002

Related U.S. Application Data

(63) Continuation of application No. 09/756,195, filed on Jan. 9, 2001, now Pat. No. 6,344,710, and a continuation of application No. 09/234,315, filed on Jan. 21, 1999, now Pat. No. 6,229,252.

(51) Int. Cl.$^7$ ................................................ G02B 5/22
(52) U.S. Cl. ........................ 359/885; 359/361; 252/582; 252/589; 313/112
(58) Field of Search ................................ 359/885, 361; 252/582, 589; 348/834, 835; 356/419; 313/489, 112

(56) References Cited

U.S. PATENT DOCUMENTS

| | | | |
|---|---|---|---|
| 3,601,532 A | 8/1971 | Bitzer | |
| 3,848,248 A | 11/1974 | MacIntyre, Jr. | |
| 4,245,242 A | 1/1981 | Trcka | |
| 4,563,612 A | 1/1986 | Deal et al. | |
| 4,785,217 A | 11/1988 | Matsuda et al. | |
| 4,977,347 A | 12/1990 | Itou et al. | |
| 4,989,953 A | 2/1991 | Kirschner | |
| 5,091,718 A | 2/1992 | Beatty | |
| 5,121,030 A | 6/1992 | Schott | |
| 5,178,955 A | 1/1993 | Aharoni et al. | |
| 5,200,667 A | * 4/1993 | Iwasaki et al. | 313/478 |
| 5,291,097 A | * 3/1994 | Kawamura et al. | 313/478 |
| 5,818,168 A | 10/1998 | Ushifusa et al. | |
| 5,834,122 A | 11/1998 | Teng et al. | |
| 5,920,429 A | * 7/1999 | Burns et al. | 359/515 |
| 6,165,546 A | 12/2000 | Teng et al. | |
| 6,229,252 B1 | 5/2001 | Teng et al. | |
| 6,344,710 B2 | 2/2002 | Teng et al. | |
| 6,452,331 B1 | 9/2002 | Sakurada et al. | |

FOREIGN PATENT DOCUMENTS

| | | |
|---|---|---|
| JP | 2-210486 | 8/1990 |
| WO | WO 00/43814 | 7/2000 |

OTHER PUBLICATIONS

Article XP-002078007 entitled "Enhancing the Brightness Capability of Color-TV Receivers Through the Use of a Spectrally Selective Tinted Glass by Hersh & Kaplan from Electrochemical Technology" Apr. 1969.

Written Opinion as received in corresponding International Application PCT/US00/01371, filed Jan. 21, 2000.

U.S. patent application Ser. No. 10/023,290, filed Dec. 20, 2001, Pending.

(List continued on next page.)

Primary Examiner—Drew Dunn
Assistant Examiner—Leo Boutsikaris
(74) Attorney, Agent, or Firm—Oblon, Spivak, McClelland, Maier & Neustadt, P.C.

(57) ABSTRACT

A bandpass filter containing specific combinations of the dyes to yield filters which are adapted to selectively transmit predetermined primary color wavelengths of an electromagnetic spectrum as well as selectively absorb wavelengths other than the predetermined primary color wavelengths. The multiple bandpass filters are employed to improve the images on CRT screens and plasma display panels.

6 Claims, 5 Drawing Sheets

OTHER PUBLICATIONS

U.S. patent application Ser. No. 10/187,633, filed Jul. 03, 2002, Pending.
U.S. patent application Ser. No. 10/176,604, filed Jun. 24, 2002, Pending.
U.S. patent application Ser. No. 10/176,683, filed Jun. 24, 2002, Pending.
U.S. patent application Ser. No. 10/222,774, filed Aug. 19, 2002, Pending.
U.S. patent application Ser. No. 10/235,487, filed Sep. 06, 2002, Pending.
U.S. patent application Ser. No. 10/251,846, filed Sep. 23, 2002, Pending.
U.S. patent application Ser. No. 10/305,194, filed Nov. 27, 2002, Pending.
U.S. patent application Ser. No. 09/234,314, filed Jan. 21, 1999, Pending.
U.S. patent application Ser. No. 10/023,290, filed Dec. 20, 2001, Pending.
U.S. patent application Ser. No. 10/119,839, filed Apr. 11, 2002, Pending.
U.S. patent application Ser. No. 10/023,290, filed Dec. 20, 2001, Pending.
U.S. patent application Ser. No. 10/199,105, filed Jul. 22, 2002, Pending.

* cited by examiner

DYE COMBINATIONS FOR MULTIPLE BANDPASS FILTERS FOR VIDEO DISPLAYS

The present application is a continuation of U.S. patent application Ser. No. 09/756,195, filed on Jan. 9, 2001, now U.S. Pat. No. 6,344,710, which is a continuation of U.S. Patent Application Ser. No. 09/234,312 filed Jan. 21, 1999, now United States Pat. No. 6,292,252.

FIELD OF THE INVENTION

The present invention is directed to filters, including multiple bandpass filters, for video display devices and similar articles. Specifically, the present invention is directed to filters containing specific dye combinations for video display devices.

BACKGROUND OF THE INVENTION

Video display devices are nowadays widely used in articles such as televisions, computers, video games and the like. Many of them generally employ a cathode ray tube (CRT) which is a vacuum tube display device in which the image is created by electrons from an electron gun striking a phosphor screen that converts the electron energy into light energy over a wide wavelength range, usually the visible range for common display devices such as television and computer monitors. The CRT may be monochromatic (single color) or a color display device which produces images in more than one color, typically the three primary colors: red, green and blue.

A common problem with video display devices is the light reflected from the device towards the viewer, which generally fatigues the viewer's eyes. The reflected light consists of ambient light reflecting off the surface of the screen (which is typically a glass surface) as well as ambient light reflecting off the phosphors behind the screen. Several attempts have been made in the past to avoid or reduce this reflected light. U.S. Pat. No. 4,989,953, in column 2, line 13 through column 3, line 22, describes some of these earlier attempts and the problems associated with them. Most of these attempts, however, have succeeded in reducing the glare from monochromatic display monitors only.

For color displays, earlier attempts to reduce light reflection included, for example, use of a neutral density filter. Neutral density filters or attenuators are designed to produce attenuation that is uniform regardless of the wavelength. See, for example, Jeff Hecht, "The Laser Guidebook," 2nd edition, McGraw-Hill, Inc., New York, 1992, page 79. Such filters comprise colloidal suspensions of silver or graphite particles in a suitable medium and adhere to the monitor surface. This type of filter transmits a fraction of the light passing through it, independent of the wavelengths. In fact, neutral density filters are widely used in the manufacturing of current color CRT displays for lack of no better alternative. These filters, however, have the disadvantage of reducing the brightness of the image.

Another approach has been to use selective filtration by using different colored plates to absorb certain wavelengths. They, however, suffer the disadvantage that one has to use a different color filter for each phosphor element. Combining several filter materials in order to transmit just the desired red, green and blue generally results in the absorption of some of the desired wavelengths due to cascading of the different filter materials. This reduces the amount of red, green and blue that eventually gets transmitted.

Yet another approach involves a combination of a neutral density filter and an antireflection coating. While this cuts down the reflected light, it also reduces the brightness and the resolution of the image.

U.S. Pat. No. 5,121,030 discloses absorption filters which contain a transparent substrate with a plurality of spatially separated areas that contain selective absorptive dye colorants. Since this requires spaced areas with different dye components therein, the construction of the filter is quite complex and difficult to manufacture in large quantities.

U.S. Pat. No. 4,989,953 referred to above advocates the use of colored filters for monochromatic displays. Thus, for example, a magenta colored filter is used for CRTs with green phosphors, and a blue colored filter is used for amber colored CRTS. However, this concept is not much useful for color displays because the blue filter, for example, will block out the red and/or green depending on the spectral characteristics of the filter. The same problem exists for the other color filters that U.S. Pat. No. 4,989,953 discloses. If such filters are used for full color displays, the resulting display color will be severely distorted. For this reason, U.S. Pat. No. 4,989,953 suggests that a neutral density or gray colored filter must be used for multi-color or black and white displays. However, this approach, as stated before, reduces the brightness of the display. Since neutral density filters absorb a substantial amount of the desired light, the displays using neutral density filters must be capable of producing intense light. This was one of the reasons for developing super bright phosphors for display applications. Such bright phosphors substantially increase the cost of the display, however.

Another kind of visual display device being increasingly used is characterized as a plasma display panel (PDP). The basic mechanism of monochrome display operation is relatively simple. Inert gases, such as helium, neon, argon, xenon or mixtures thereof are hermetically sealed in a glass envelope and are subjected to a high voltage which causes the gas to ionize, producing a plasma. Color operation can also be achieved in a plasma display. Such operation utilizes ultraviolet light generated by the plasma discharge, rather than the glow of color of the plasma directly. Thus in color operation, phosphors are placed in the vicinity of the plasma discharge. The plasma-generated UV light hits the phosphors and generates visible light for the display. Plasma display panels, also known as gas display panels, have features such as a wide viewing angle, easy to see display because of self light emission, and a slim form. These advantages have encouraged increasing use of gas discharge display panels for high quality television sets. The exact structure of the PDPs is not a feature of the present invention, and it is contemplated that the filters of this invention are useful for any color PDP regardless of the exact configuration. Those of ordinary skill in the art would be capable of using the inventive filter with any PDP device.

Unfortunately, plasma displays currently being developed by various display manufacturers, still do not have high enough brightness nor high enough red, green and blue color transmission. Therefore, neutral density filters cannot effectively be used for color and contrast enhancement in plasma display applications since such filters would further reduce the brightness of the display. Additionally, since the sub-pixels of the phosphors are in close proximity to each other, there is a need for a physical barrier to prevent stimulation of a non-selected phosphor region. To achieve truer color emissions from the displays, devices such as very expensive circular polarizer-based contrast enhancing filters are being used.

Thus, in view of the varied uses and potential uses for CRTs and plasma display panels there is a need in the industry to have some device or mechanism to efficiently reduce the reflected light from the display devices as well as increase overall color and improve contrast and color enhancement without significantly sacrificing the brightness and resolution of the image.

It is, therefore, an object of this invention to provide a filter for color displays to reduce light reflected off such displays.

It is an additional object of this invention to provide a filter containing specific dye sets to enhance the contrast and color of images from a color display monitor without significantly sacrificing brightness of the image therefrom.

It is a further object of this invention to provide a spectrally tuned multiple bandpass filter for color displays, specifically matched to the three primary colors, namely red, green, and blue.

Other objects and advantages of this invention will be apparent to those skilled in the art from the accompanying description and examples.

SUMMARY OF THE INVENTION

One or more of the foregoing objects are achieved by the provision in the present invention of a spectrally tuned bandpass filter which is adherable to a display monitor surface in a variety of ways and enhances the contrast and color of the image without significantly affecting the brightness and resolution of the image. The filter of the present invention also can be free-standing and placed in front of the display monitor. The filter comprises specific dye sets comprising specific combinations of dyes which are adapted to substantially selectively transmit predetermined primary color wavelengths of an electromagnetic spectrum as well as to selectively absorb wavelengths other than said predetermined primary color wavelengths. The dyes may be on a suitable transparent substrate which is then adhered to the monitor surface, or alternately, the dyes may be directly deposited on the monitor surface by a suitable process such as, for example, spray coating. Preferably, the combination of dyes are uniformly mixed within a transparent polymer matrix.

The word "spectrally tuned" refers to the substantial selective transmission (at least 50%) of the predetermined primary colors; the word "transparent" refers to at least 70% transmission of light of the electromagnetic spectrum which in the common case such as television display devices such as CRT, plasma displays and the like, is the visible light. In such a case, the primary colors are red, green and blue.

Additionally, the present inventive bandpass filter allows one to expand the color gamut by adjusting the spectral bandwidth of the bandpass windows in the respective wavelengths, thereby allowing more vivid and realistic colors on CRTs and PDPs. This is a significant improvement over present visual display technology.

The present inventive bandpass filter also shields electromagnetic induction and IR radiation from PDPs which interfere with the operation of remote control units.

Still additionally, if one so desired, one may deposit a suitable antireflection coating on top of the inventive contrast enhancing filter. In that case, the antireflection coating should be chosen as not to affect the integrity of the filter physically, chemically and optically. Suitable antireflection coatings are described, for example, in U.S. Pat. No. 5,178, 955.

DESCRIPTION OF THE INVENTION

The present invention discloses a spectrally tuned multiple bandpass filter (notch filter) which substantially increases the transmission of the primary colors from the reflected light of a color display device while substantially absorbing the non-primary colors, and thereby improves the contrast and color of the image for the viewers. The filter comprises a specific set of suitable dyes that substantially absorb the non-primary colors without significant effect on the primary colors.

Contrast from a display device screen is generally defined by the term "contrast ratio". Contrast ratio, C, is commonly defined by the Equation 1:

$$C = \frac{\int T(\lambda)S(\lambda)I_p(\lambda)d\lambda}{\int T^2(\lambda)S(\lambda)I_a(\lambda)R(\lambda)d\lambda} \quad (1)$$

where T is the transmittance of the substrate as a function of wavelength $\lambda$, S is human eye spectral sensitivity function, $I_p$ and $I_a$ are respectively the display source intensity (e.g., phosphor emission intensity) and the ambient light source intensity, and R is the Reflection Coefficient for the display phosphors. As can be seen, C can be increased by making $I_a$ and/or $T(\lambda)$ arbitrarily small for a given display system. However, if a display is viewed in the total darkness ($I_a$ very small), although one can have very high contrast, it becomes very difficult to compare two different displays without using an identical condition. Display industries are therefore making an attempt to use a standardized ambient light condition in comparing display performance. Similarly by increasing $I_p$, one can improve C. In fact, display industry is working very hard to increase $I_p$. Since $I_a$ and $I_p$ are independent of contrast enhancing devices, normalized intensities functions given in Equations 2 and 3 are generally defined in order to compare the performance of contrast enhancing devices:

$$i_p = \frac{\int T(\lambda)S(\lambda)I_p(\lambda)d\lambda}{\int S(\lambda)I_p(\lambda)d\lambda} \text{ and} \quad (2)$$

$$i_a = \frac{\int T(\lambda)S(\lambda)I_a(\lambda)d\lambda}{\int S(\lambda)I_a(\lambda)d\lambda} \quad (3)$$

where $i_a$ and $i_p$ are normalized ambient and display intensities respectively. Normalized contrast (C) and the figure-of-merits ($\eta$) are defined as in Equations 4 and 5 respectively:

$$\overline{C} = \frac{i_p}{i_a} \text{ and} \quad (4)$$

$$\eta = \overline{C}i_p = \frac{i_p^2}{i_a} \quad (5)$$

For an ideal neutral density or similar filters, there is no improvement in the figure-of-merits, i.e., $\eta=1$. Thus, they do not improve the real performance, but provide a trade-off between display brightness and contrast. In other words, they offer contrast enhancement at the expense of image brightness. Thus, for example, for a 50% absorptive neutral density filter, contrast may be doubled, i.e., $\overline{C}=2$, $i_p=0.5$ and $i_a=0.25$. But there is 50% absorption.

The figure-of-merit is a contrast between the color contrast of the image and the brightness of the image. In other words, the figure-of-merit is a balance between the two variables of color contrast and brightness of the image. Both good color contrast and brightness are desired. For example, an $\eta=1.2$ means that the contrast is about 20% greater than the brightness. An $\eta<1$ means that the contrast can still be improved in the image.

The spectrally tuned filters of the present invention comprise suitable dyes and a polymer matrix and it may be present on a CRT or PDP monitor with or without an intermediary polymeric substrate. The filters of the present invention can also be free-standing and can be placed in front of the monitor. Suitable dyes are those which selectively absorb undesired wavelengths without significantly absorbing the desired wavelengths. The desired wavelengths correspond to the three primary colors; red, blue and green. Table 1 lists illustrations of suitable dyes useful in the practice of the invention. Many of these are commercially available trademarked materials from various sources. One such source is Aldrich Chemical Company, Milwaukee, Wis.

TABLE 1

List of Suitable Dyes

Astrazon Orange G
Brilliant Blue R
Luxol Fast Blue MBSN
Bromochlorophenol Blue Sodium salt
Bromophenol Blue Sodium salt
Bromocresol Purple Sodium salt
2',7'-Dichlorofluorescein
Eosin Y
Fluorescein
Fluorescein amine isomer 1
Fluorescein amine isomer 11
Fluorexon TABLE 1-continued List of Suitable Dyes Bromophenol Blue
Acridine Orange
Acridine Orange base
o-Cresolphthalein
o-Cresolphthalein complexone
Cresol Red
Fast Blue
Mordant Orange 1
Phloxine B
Pyronin B
Rhodamine 101
Rhodamine 123 Hydrate
Sulfobromophthalein Sodium Hydrate
Sulforhodamine 101 Hydrate
Chlorophenol Red
LC 5410
LC 6550
IRA 850

Particularly useful dyes for general purpose image enhancement application in the filters of this invention should have the following characteristics:
1. Absorption Characteristics
   a) Absorption peak ($\lambda$) falling into one of the following wavelength regions:
      ⇒ $\lambda<430$ nm
      ⇒ 470 nm$<\lambda<510$ nm
      ⇒ 550 nm$<\lambda<610$ nm
      ⇒ $\lambda>650$ nm
   b) Absorption Bandwidth is within the range of 30–80 nm.
2. Stability
   a) Light fastness
      ⇒ Less than 10–20% degradation under 85 MJ/m$^2$ exposure of white light (400 nm to 700 nm).
   b) Thermal stability
      ⇒ Less than 10–20% degradations under following stress conditions 70° C., 70% RH and 72 hrs.
3. Solubility
   a) Soluble in an environmentally friendly solvent.
   b) Soluble in an optically clear polymer resin matrix suitable for high quality coating.

Various combinations of the dyes listed in Table 1 may be employed to obtain a bandpass filter adapted to selectively transmit predetermined primary color wavelengths of the electromagnetic spectrum while, at the same time selectively absorbing wavelengths other than the predetermined primary color wavelengths to improve the contrast and color on a video screen.

Preferred dyes employed in the bandpass filters of the present invention include combinations of LC 5410, LC 6550, Rhodamine 101, Luxol Fast Blue MBSN, Mordant Orange 1, Fluorescein amine isomer 1, Phloxine B, and Sulphurhodamine 101.

Figure 1:
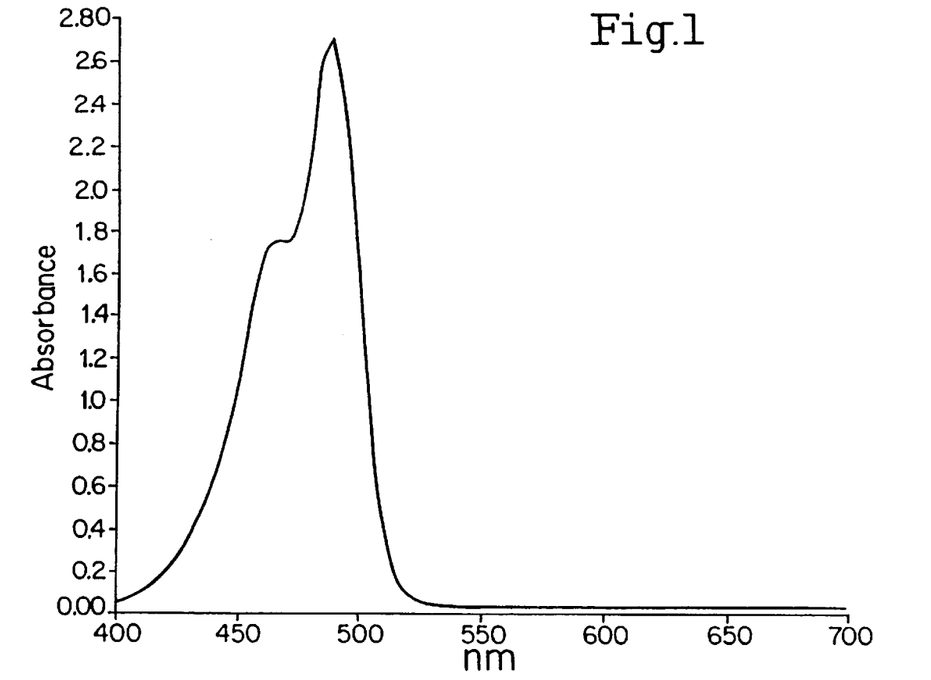
FIG. 1 is an absorbance vs wavelength spectrum for dye LC 5410.
Figure 2:
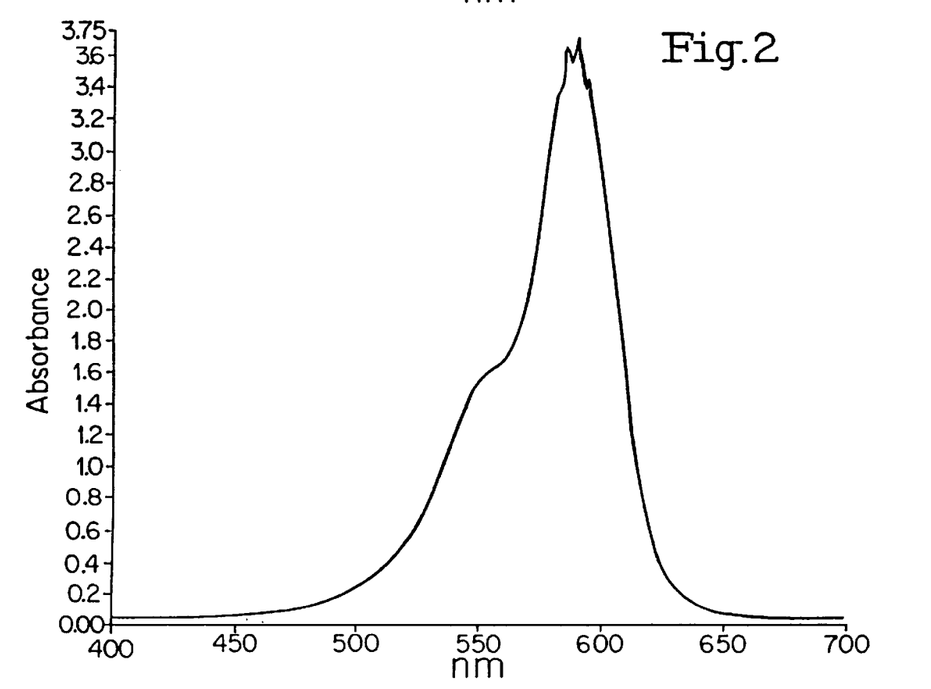
FIG. 2 is an absorbance vs wavelength spectrum for dye LC 6550.

FIG. 1 is an absorbance spectrum of the dye LC 5410 and FIG. 2 is an absorbance spectrum of the dye LC 6550. The absorbance spectra of both LC 5410 and LC 6550 were prepared by measuring the spectrum of a 0.1% solution of the dyes in methyl alcohol using a standard spectrophotometer. The numerical value of the optical density, i.e., an absorbance peak, of the dye is not particularly important in defining the dye material. The value of optical density or absorbance of a particular peak is always going to be greater when the concentration of the test sample is increased. However, the wavelength where the peak or peaks of the absorbance spectra occur are unique and remain constant for a particular dye. The location of the defining absorption peak or peaks is fixed once the dye and solvent system are selected. Thus, it is the location of the absorptive peak or peaks which characterizes a dye or dye composition.

In addition to the location of the absorption peak along the nm scale, the band width of the peak or peaks can also be employed to define or characterize and identify a dye. As with the location of the absorption peak, the band width measured in nm is always the same regardless of the concentration of the dye in the sample measured. In an optical density versus wavelength plot, the full width at the half of the peak height is measured as with band width. The dyes LC 5410 and LC 6550 are Lambdachrome® laser dyes and can be obtained from Lambda Physik, Inc., 3201 West Commercial Boulevard, Fort Lauderdale, Fla. 33309. Lambda Physik, Inc., is a subsidiary of Coherent, Inc., Santa Clara, Calif.

The dye compositions (the total weight of all the dyes) comprise generally from about 0.01% to about 10% by weight of the dry carrier matrix used to form the filter of this invention. Preferably, the dyes comprise from about 0.04% to less than about 4.0% by weight of the dry matrix. The following are general and preferred ranges of particular dyes useful in this invention. Specific amounts of each dye in particular combinations of dyes are shown in the Examples and can provide a reference to the effect each dye has on the overall absorbance spectrum of the filter. Such examples can suggest other useful dye combinations within the general and preferred weight ranges shown and even beyond the combinations shown in the examples to provide an effective color filter.

One preferred dye set includes the combination of Fluorescein amine isomer 1, Phloxine B, Sulphurhodamine 101, and Luxol Fast Blue MBSN. A second preferred dye set includes the combination Mordant Orange 1, Fluorescein amine isomer 1, Phloxine B, Sulphurhodamine 101, and Luxol Fast Blue MBSN. A third preferred dye set includes the dyes LC 5410, LC 6550, rhodamine 101, and Luxol Fast Blue MBSN. The following amounts of each dye listed above have been found useful in preparing filters in accordance with this invention. These amounts are meant to provide a guide for forming compounds within the scope of this invention and are not intended to limit the scope of the invention strictly to the amounts shown. LC 5410 comprises about 0.40% to about 0.60% by weight of the dry polymer matrix of the filter, preferably from about 0.45% to about 0.55% by weight of the matrix. LC 6550 is included in amounts such that the dye comprises from about 0.20% to about 0.35% by weight of the matrix, preferably from about 0.25% to about 0.30% by weight of the matrix. Rhodamine 101 dye comprises from about 0.05% to about 0.25% by weight of the matrix, preferably from about 0.10% to about 0.20% by weight of the matrix. Luxol Fast Blue MBSN is included in amounts of from about 0.10% to about 1.5% by weight of the matrix, preferably from about 0.50% to about 1.25% by weight of the matrix. Fluorescein amine isomer 1 is included in amounts of from about 0.35% to about 0.60% by weight of the matrix, preferably from about 0.40% to about 0.55% by weight of the matrix. Phloxine B is included in amounts of from about 0.1% to about 0.2% by weight of the matrix, preferably from about 0.15% to about 0.175% by weight of the matrix. The dye Sulphurhodamine 101 comprises from about 0.20% to about 0.45% by weight of the matrix, preferably from about 0.35% to about 0.40% by weight of the matrix. The dye Mordant Orange 1 comprises from about 0.50% to about 1.0% by weight of the matrix, preferably from about 0.70% to about 0.9% by weight of the matrix.

Figure 9:
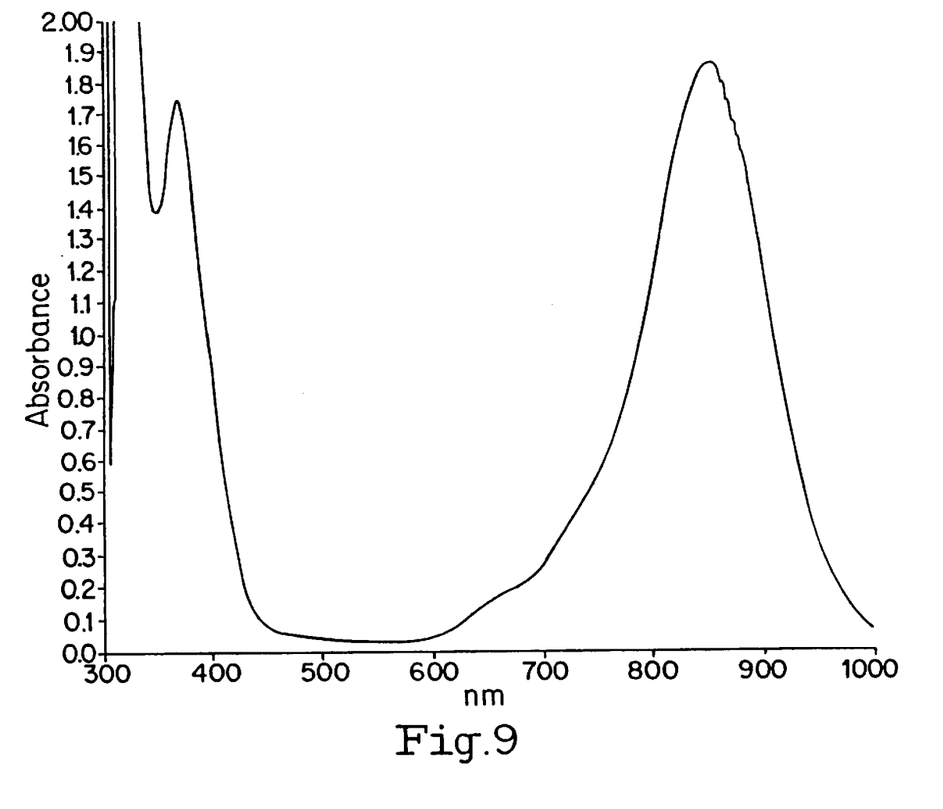
FIG. 9 discloses the absorbance spectrum of dye IRA 850 dissolved in methyl ethylketone and dimethylfuran in a polymethyl methacrylate matrix.

Another suitable dye which can be employed to practice the present invention is IRA 850. The IRA 850 dye is especially effective in IR shielding. IR radiation emitted from plasma display panels interferes with the operation of remote control units thus, compromising the optimum performance of such electronic equipment. The dye is available from Exciton, Inc., 400 Linden, Dayton, Ohio. FIG. 9 illustrates the absorbance spectrum identifying the dye. The absorbance spectrum was prepared by adding a 0.05% sample of the IRA 850 dye to a solution of about 33% dimethylfuran and a 67% mixture of polymethyl methacrylate and methylethyl ketone by weight. The sample was measured on a standard spectrophotometer.

To prepare the filters of the present invention, a set of suitable dyes (e.g., from Table 1) and resin system is dissolved in a suitable solvent to a sufficient enough concentration to result in sufficient absorption of the undesired wavelengths in the transmitted light when on the monitor. Sufficient absorption is generally over 20%, preferably over 50% and typically over 80%. Suitable solvents are those that are compatible with the solvents chosen for the polymer matrix material as well as dependent on whether or not the dye/polymer matrix combination is going to be present on a polymeric substrate before going on the monitor. Such modifications and techniques will be obvious to those skilled in the art of coatings. Generally a lower alcohol, water and the like solvents are non-corrosive and compatible with each other. Thus, for example, the dyes may be dissolved in a lower alcohol to form solution A, the polymer matrix material may be dissolved in water or alcohol to form solution B and the two solutions may then be mixed in sufficient quantities. Polymer matrix materials are those polymers which are compatible with the other materials mentioned above and also form optically transparent films. Some examples include polyvinyl alcohol (PVOH), polyvinyl acetate (PVA), vinyl polymers and polyacrylates such as polyolefins, polymethyl methacrylate (PMMA), polystyrene, and cycloolefin polymers and copolymers (COC), polycarbonate, polyurethane, polyamide, polyester, polyether, polyketone, polyesteramide, polyvinyl butyrate (PVB), and the like. Many of the polymers may also be crosslinkable by suitable techniques such as, for example, thermal, radiation cure and the like. After mixing solutions A and B, one may optionally add additives such as, for example, viscosity modifiers, surfactants, volatilizers and the like in order to ease and/or enhance film casting, film drying, film thickness and the like. Such techniques are well known in the coatings industry.

One or more films may be formed from the mixture of dye or dyes and polymer matrix by any suitable technique such as, for example, solvent casting, extrusion, spray coating, roller coating, dip coating, brush coating, spin coating and the like. Such film forming techniques are well known. Alternately, instead of forming the film or films from a mixture of dye and polymer, the polymer matrix may be formed first as a film and then dyed. The film, or films may then be affixed to the monitor surface by a suitable method such as, for example, use of adhesives.

Still alternately, the mixture of dye and polymer matrix may be spun coated on a suitable substrate as a film or films. The coated substrate may then be affixed to the monitor surface by a suitable method such as, for example, use of adhesives. Suitable substrates are glass as well as polymeric. Suitable polymeric substrates are optically transparent polymers such as, for example, polyesters, polyacrylates, polyolefins, polycarbonate and the like. Among polyesters, polymer films such as polyethylene terephthalate (PET), polybutylene terephthalate (PBT) are preferred.

When extruded to form a film, the dyes can be incorporated into the molten polymer matrix during extrusion into a film, or the dye and polymer matrix can first be extruded into pellets and the pellets melted and extruded into the desired film. The film may be affixed to the monitor surface by any suitable method. Such method is particularly useful when a polyester such as PET or PBT is used as the matrix.

In yet another alternate manner, the dye/polymer mix may be sprayed directly onto the monitor to form a suitable film. The invention is flexible enough to accommodate such varied methods.

The films or filters of the present invention may be employed on the outer face plate of any video monitor to selectively transmit predetermined primary color wavelengths of red, green, and blue as well as selectively absorb wavelengths other than the predetermined primary color wavelengths. Such video monitors include but are not limited to CRTs and plasma display panels.

Colored CRTs or cathode ray tubes are well known in the art and are employed in televisions and computers. The filter of the present invention may be placed over the outer surface of the CRT screen. The inner surface of the CRT screens contains color phosphors. Alternatively, the filter can be free-standing and can be placed before the CRT screen. Examples of such CRTs are disclosed in U.S. Pat. No. 4,977,347, to Itou et al., U.S. Pat. No. 4,563,612, to Deal et al., and U.S. Pat. No. 5,200,667 to Iwasaki et al., the disclosures of which are incorporated in their entirety herein by reference.

The bandpass filters of the present invention can also be employed on plasma display panels. Plasma display panels are essentially a sandwich of glass sealed at the edges with a low temperature frit enclosing an inert gas mixture and thin-film conductive electrodes on the inner surfaces of the glass. Parallel lines of transparent conductors are placed on one of the inner surfaces and metal electrodes are on the outer surfaces. The filter of the present invention is placed on the face of the outer glass surface, or the filter can be free-standing and can be placed before the face of the outer glass surface. Examples of suitable plasma display panels are U.S. Pat. No. 5,818, 168, to Ushifusa et al., and U.S. Pat. No. 3,601,532, to Blitzer et al., the disclosures of which are incorporated herein in their entirety by reference.

The following examples are intended to illustrate the present invention, but are not intended to limit the scope of the invention.

EXAMPLE 1

The present dye set was developed to prove the concept that dye combinations can improve color contrast for displays, especially for plasma display panels.

The dye set was prepared by dissolving sufficient amounts of Fluorescein amine isomer 1, Phloxine B, Sulphurhodamine 101 and Luxol Fast Blue MBSN in a solution of 50% water, 30% isopropyl alcohol and 20% methyl alcohol such that the final dry weights of the dyes in the polymer matrix are as given below. The dye solution was added to a solution of polyvinyl acetate (polymer matrix). A few drops (about 0.01% by weight) of the surfactants Genepol® and Dynol® were added to the mixture. The film was spun-coated on a 4mil (100 microns) thick polyethylene terephthalate substrate at about 1,000 rpm for about 30 seconds. The film was then dried in an oven at about 50° C. for about 30 minutes to achieve a total dry film thickness of about 8 microns. The weight of the dyes in relation to the dry polymer matrix was about 0.53% Fluorescein amine isomer 1, about 0.15% Phloxine B, about 0.38% Sulphurhodamine 101, and about 0.70% Luxol Fast Blue MBSN. This was mounted on a monitor (a 5 inch diameter color television monitor).

Figures 3, 4:
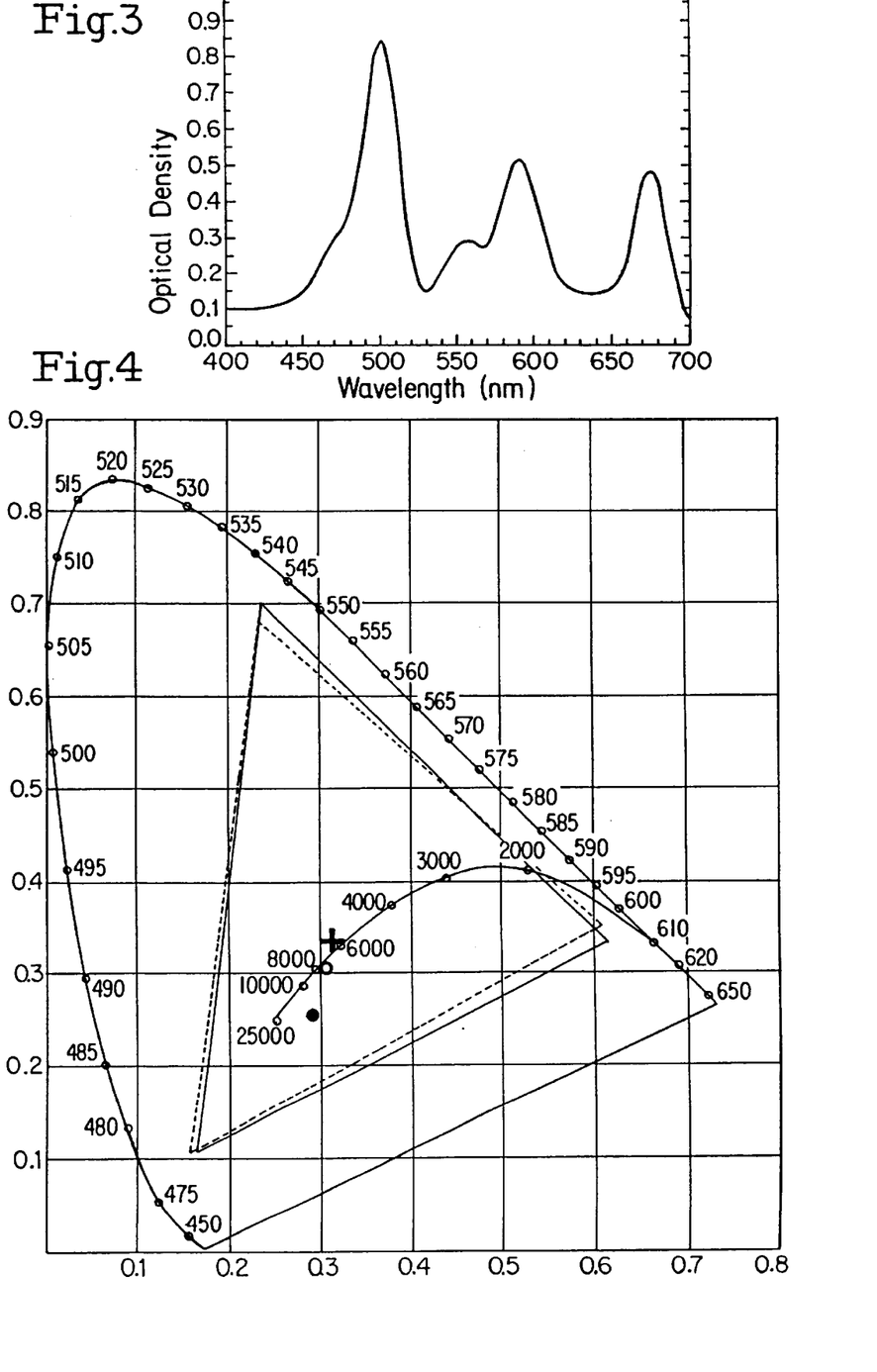
FIG. 3 is an optical density vs wavelength spectrum of a dye set containing Fluorescein amine isomer 1, Phloxine B, Sulfurhodamine 101 and Luxol Fast Blue MBSN in a polyvinyl acetate polymer.
FIG. 4 is a chromaticity diagram of the filter composed of a dye set containing Fluorescein amine isomer 1, Phloxine B, Sulfurhodamine 101 and Luxol Fast Blue MBSN in a polyvinyl acetate polymer.

FIG. 3 illustrates the absorbance spectrum of the present dye set and shows substantial absorbance of non-primary color light. Table 2 shows that this dye combination yielded improved contrast enhancement, i.e., about 85% improvement over a PDP display without the filter.

The coloring phenomenon of the reflected light and the effects of the present dye set for reducing such a coloring phenomenon are described in the CIE standard chromaticity diagram of FIG. 4. FIG. 4 also shows a spectrum locus of the subject dye set of a blackbody radiation in a CIE standard chromaticity diagram. The cross in the diagram shows the white point or sunlight and the solid dot shows the point of ambient light and the circle shows the point of the white reflected light in relation to the dye set. Table 2 further shows the color coordinates achieved with the filter using the dye combination of Example 1. The color coordinates of the PDP without the filter is also shown in Table 2.

EXAMPLE 2

Figure 5:
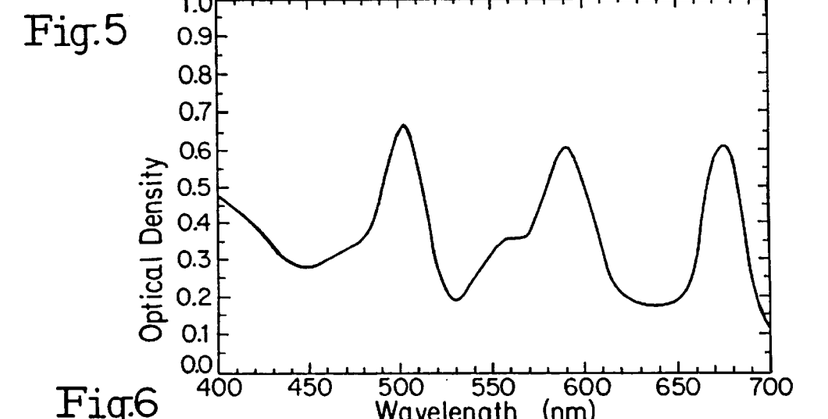
FIG. 5 is an optical density vs wavelength spectrum of a dye set containing Mordant Orange 1, Fluorescein amine isomer 1, phloxine B, Sulfurhodamine 101 and Luxol Fast Blue MBSN in a polyvinyl acetate polymer.
Figure 6:
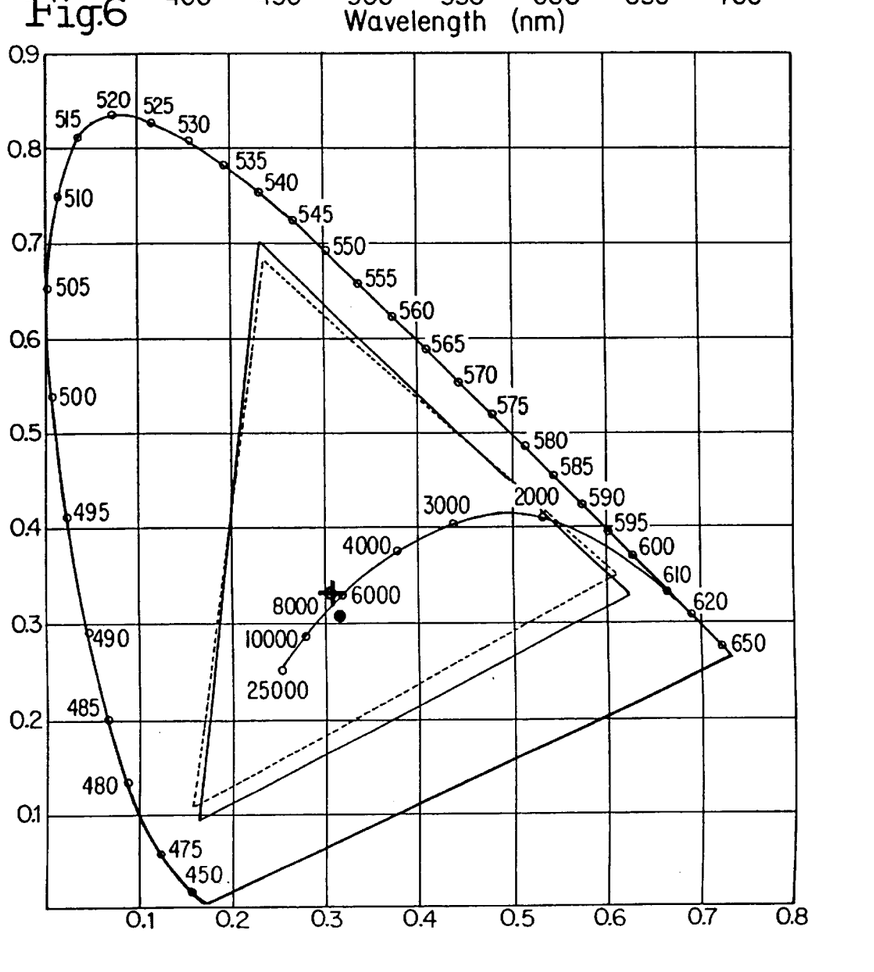
FIG. 6 is a chromaticity diagram of the filter composed of a dye set containing Mordant Orange 1, Fluorescein amine isomer 1, Phloxine B, Sulfurhodamine 101 and Luxol Fast Blue MBSN in a polyvinyl acetate polymer.

The dye package comprised Mordant Orange 1 in amounts of about 0.80% by weight of the dry film or polymer matrix, about 0.40% Fluorescein amine isomer 1, about 0.15% Phloxine B, about 0.38% Sulphurhodamine 101 and about 1.0% Luxol Fast Blue MBSN by weight of the dry polymer matrix. The dye package was incorporated into a polyvinyl acetate polymer matrix. The method for preparing the present filter and dye set was the same method as described in Example 1. The present dye set provided a filter which was color balanced under room light on the plasma display panel screen. Table 2 shows that the filter of Example 2 had vastly improved contrast over the PDP without the filter. Improvement in all three primary colors and improved figure-of-merit relative to Example 1 are also shown. The present dye set represents a true full-color bandpass filter. Also, the dye set presented an agreeable risk color such that the pink was barely noticeable. FIG. 5 represents the absorbance spectrum of the dye package and FIG. 6 is the chromaticity diagram illustrating the coloring phenomenon of the reflected light and the effects of the present dye package for reducing such a coloring phenomenon.

EXAMPLE 3

This dye package comprised about 0.50% by weight of the polymer matrix of LC 5410, the absorbance spectrum of which is illustrated in FIG. 1, about 0.27% LC 6550 by weight of the polymer matrix, the absorbance spectrum of which is illustrated in FIG. 2, about 0.18% Rhodamine 101 and 1.2% Luxol Fast Blue MBSN by weight of the polymer matrix. The polymer matrix was composed of polyvinyl acetate and the filter was prepared by the same method as the filter disclosed in Example 1 above.

Figure 7:
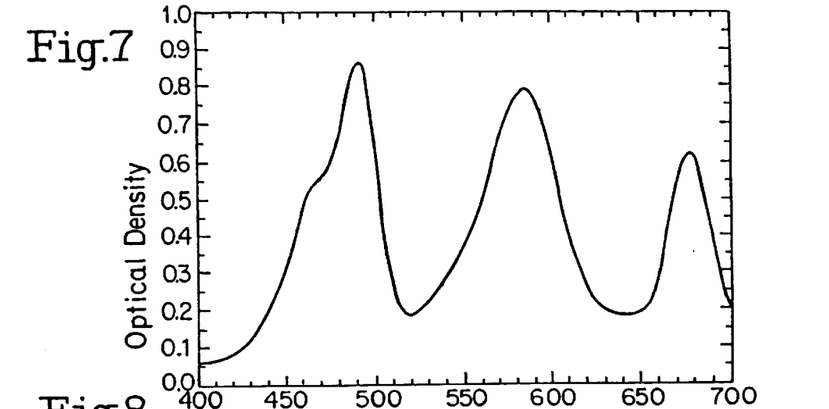
FIG. 7 is an optical density vs wavelength spectrum of a dye set containing LC 5410, LC 6550, Rhodamine 101 and Luxol Fast Blue MBSN in a polyvinyl acetate polymer matrix.
Figure 8:
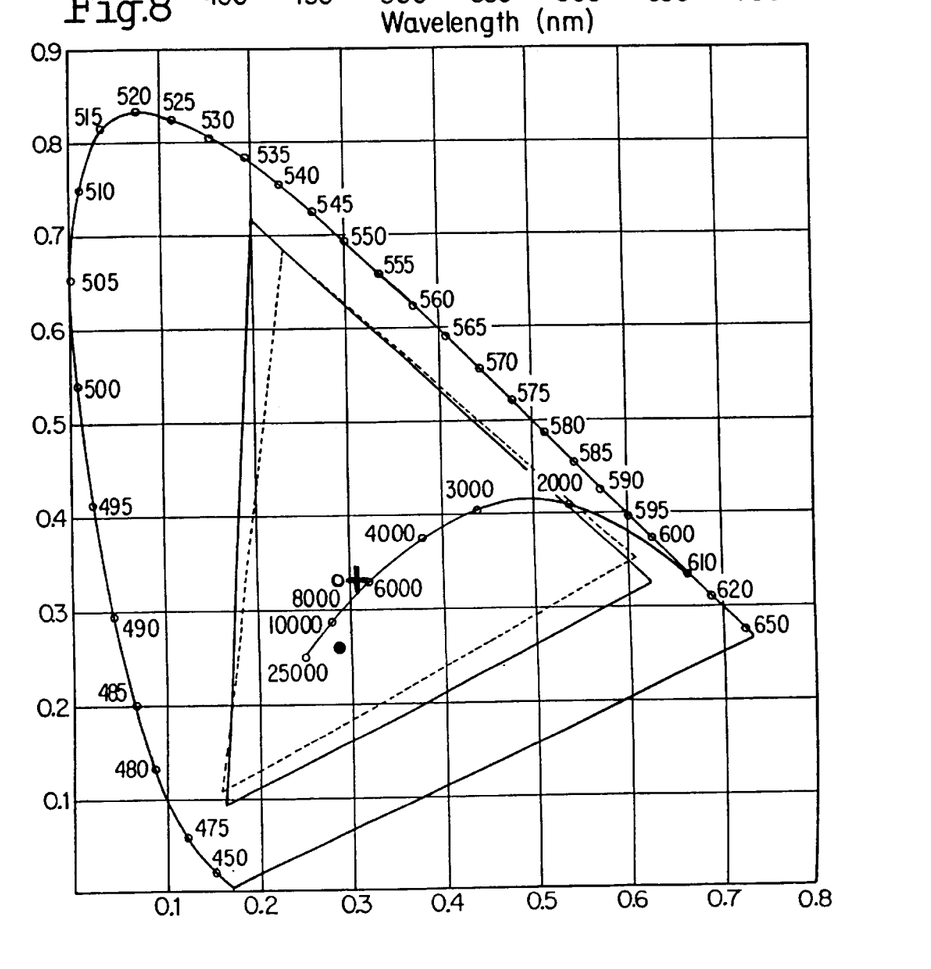
FIG. 8 is a chromaticity diagram of the filter composed of a dye set containing LC 5410, LC 6550, Rhodamine 101, and Luxol Fast Blue MBSN in a polyvinyl acetate polymer.

The present dye set and filter achieved a figure-of-merit greater than 1, while further improving the color performance significantly, particularly for green compared to the filter and dye set of Example 2 above. The results are tallied in Table 2 and are illustrated in the absorbance spectrum of FIG. 7 and in the chromaticity diagram of FIG. 8. In addition to improving the green emission, the present dye package improved the blue phosphor emission by pushing the blue emission distribution beyond 450 nm. The present dye set is an important improvement in the field since conventional neutral density filters have a figure-of-merit of 1 with no color improvement.

TABLE 2

Polymeric Image Enhancement Film Comparison of Performance of Dye Sets on PDP

|  | Red | Green | Blue | White | Ambient | Color Temp ° K. | Brightness | Contrast | Figure of Merit |
|---|---|---|---|---|---|---|---|---|---|
| No filter | 0.607, 0.353 | 0.236, 0.684 | 0.157, 0.107 | 0.311, 0.334 | 0.310, 0.317 | 6500 | 1 | 1 | 1 |
| Example 1 | 0.619, 0.332 | 0.237, 0.700 | 0.162, 0.107 | 0.302, 0.306 | 0.293, 0.254 | 7300 | 0.506 | 1.84 | 0.9130 |
| Example 2 | 0.624, 0.332 | 0.229, 0.704 | 0.159, 0.096 | 0.306, 0.331 | 0.316, 0.309 | 7000 | 0.458 | 2.14 | 0.9801 |
| Example 3 | 0.626, 0.325 | 0.200, 0.722 | 0.162, 0.092 | 0.288, 0.333 | 0.277, 0.261 | 8000 | 0.427 | 2.44 | 1.0418 |

What is claimed is:

1. A bandpass filter for contrast and color enhancement of a video monitor which comprises dyes having the following absorption characteristics:

Absorption Characteristics
a) Absorption peak ($\lambda$) falling into one of the following wavelength regions:
$\lambda < 430$ nm
470 nm $< \lambda <$ 510 nm
550 nm $< \lambda <$ 610 nm
$\lambda > 650$ nm
b) Absorption Bandwidth is within the range of 30–80 nm; and wherein the dyes have the following stability characteristics:

Stability
a) Light fastness
Less than 10–20% degradation under 85 MJ/m$^2$ exposure of white light (400 nm to 700 nm),
b) Thermal stability
Less than 10–20% degradations under following stress conditions 70° C. 70% relative humidity and 72 hrs.

2. The bandpass filter according to claim 1, which has at least 50% selective transmission of primary colors and at least 70% transmission of light of electromagnetic spectrum.

3. The bandpass filter according to claim 1, wherein the dyes are uniformly incorporated in a polymer matrix on a transparent substrate which is then adhered to the monitor surface.

4. The bandpass filter according to claim 3, wherein the polymer matrix is composed of polyvinyl acetate, polyvinyl alcohol, vinyl polymers, polyacrylates, polyurethane, polyamide, polyester polyether, polyketone, or polyesteramide.

5. The bandpass filter according to claim 1, which has functions of shielding electromagnetic induction and IR radiation.

6. The bandpass filter according to claim 1, which has a function of antireflection.

* * * * *